Patented Mar. 29, 1949

2,465,888

UNITED STATES PATENT OFFICE 2,465,888

BUTADIENE EMULSION POLYMERIZATION IN THE PRESENCE OF LEVOPIMARIC ACID-MALEIC ANHYDRIDE ADDITION PRODUCT ESTERS

Ray V. Lawrence, New Orleans, La., assignor to the United States of America as represented by the Secretary of Agriculture No Drawing. Application October 18, 1946, Serial No. 703,975

7 Claims. (Cl. 260—83.7)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to the polymerization of butadiene-1,3 hydrocarbons either alone or in admixture with other polymerizable compounds.

One object of this invention is the provision of a method whereby butadiene-1,3 hydrocarbons and styrene or other aryl olefins may be copolymerized in an aqueous emulsion to yield synthetic rubbers of increased tensile strength and elongation, with improved tack and milling characteristics.

The formation of an elastomeric product resembling natural crude rubber by the copolymerization of butadiene-1,3 hydrocarbons with styrene in an aqueous emulsion containing a mercaptan modifier and peroxide catalyst is well known. The emulsifying agents most commonly used in this process are fatty acid soaps and stabilized rosin soaps. The copolymers so formed are usually inferior to natural rubber in several characteristics, such as tensile strength, elongation, milling characteristics and tack. I have discovered that when the above-mentioned emulsion polymerization is carried out using the sodium or potassium salt of an alkyl ester, such as the methyl, ethyl, propyl or butyl ester, of the addition product of levopimaric acid and maleic anhydride as the emulsifying agent, an improved copolymer having a higher tensile strength, increased elongation and improved milling characteristics and tack is formed.

These emulsifying agents may be prepared in a number of different ways. One of the most satisfactory methods that I have found is to separate the addition product of levopimaric acid and maleic anhydride from pine oleoresin according to the method described in United States Patent 2,359,980. This adduct is then esterified by heating with the desired alcohol, using sulfuric acid or toluene sulfonic acid as a catalyst. The mono-alkyl esters of the addition product of levopimaric acid and maleic anhydride appear to be the most desirable for the preparation of emulsifying agents. This is not critical as the presence of small amounts of the free acid or of the dialkyl esters appears to have little effect. In the case of the ethyl ester, the most satisfactory product appears to be one having an acid number of 120–160, as determined by the A. S. T. M. method for rosin. (One of the carboxyl groups of this acid is not titrated by this procedure.)

The sodium or potassium salt of the monoester may be prepared by reaction either with the aqueous or alcoholic sodium or potassium hydroxide solution. If the anhydrous salt is desired, the solution can be evaporated to dryness under vacuum.

Care must be taken to avoid prolonged heating of the ester in the presence of sodium or potassium hydroxide solution since saponification of the ester group may occur.

Other methods of preparation of satisfactory mono-esters include the esterification of rosin or rosin acid with the desired alcohol and the reaction of maleic anhydride with the rosin ester. Or, rosin and maleic anhydride may be caused to react and the crude reaction product esterified. These products formed using rosin as a starting material usually require purification before they are satisfactory for use in the emulsion polymerization procedure.

The addition product of levopimaric acid and maleic anhydride is known to be identical with the addition product of abietic acid and maleic anhydride. The adduct product formed by the reaction of rosin or rosin esters and maleic anhydride above 150° C. is also identical with the adduct product formed from the reaction of levopimaric acid and maleic anhydride, and satisfactory results may be obtained with all such products if they are properly purified to remove material which slows down the rate of the polymerization reaction. It is to be understood that wherever the addition product of levopimaric acid and maleic anhydride is mentioned herein, the addition product of abietic acid and maleic anhydride is also included, and vice versa.

The manner by which the above-mentioned esterified adduct emulsifying agents act to improve the quality of the polymer formed is not thoroughly understood. However, these emulsifiers appear to be much more effective when used in place of the usual soap as emulsifying agents than when added after the polymerization has taken place. Thus, when a mixture of 75 parts of butadiene-1,3 and 25 parts of styrene were polymerized using 180 parts by weight of a 3 percent solution of the sodium salt of the ethyl ester of the addition product of levopimaric acid and maleic anhydride as the emulsifying agent and 5 parts of stearic acid added on the mixing rolls, the polymer obtained, when vulcanized, gave a synthetic rubber having greater tensile strength and elongation and better tack and milling characteristics than did the vulcanized polymers formed in the same manner using 5.4 parts of sodium stearate as the emulsifying agent and adding 5 parts of the ethyl ester of the addition product of levopimaric acid and maleic anhydride to the polymer on the mixing rolls. This indicates that there is a desirable effect obtained by using the sodium adduct ester as an emulsifying agent, which is greater than that obtained merely by its presence in the polymer. It appears that the sodium adduct ester may conceivably exert a directive influence during the copolymerization reaction.

The sodium salt of an alkyl ester of the addition product of levopimaric acid and maleic anhydride may be used as the emulsifying agent for the emulsion polymerization of butadienes 1-3 by which is meant butadiene 1-3, and its homologs, such as isoprene and 2,3 dimethyl butadiene-1,3 either alone or in admixture with other unsaturated compounds polymerizable therewith known as comonomers, such as styrene and its homologs and analogs and other aryl olefins. The sodium salt of an alkyl ester of the addition product of levopimaric acid and maleic anhydride may also be used as the emulsifying agent for the emulsion polymerization of other polymerizable dienes, such as myrcene, either alone or in admixture with other unsaturated compounds polymerizable therewith, such as styrene and its homologs and analogs.

The concentration of the sodium salt of the alkyl ester of the addition product of levopimaric acid and maleic anhydride used for the abovementioned polymerizations may be varied from approximately 0.5% to 5% based on the amount of water present. However, I prefer to use 180 parts of water containing approximately 3 percent (5.4 parts) of the above-mentioned emulsifying agents for each 100 parts of hydrocarbon monomers to be polymerized. The sodium salt of these esters may also be used in conjunction with other emulsifying agents, such as the fatty acid soaps or stabilized rosin soaps for the production of synthetic elastomers by emulsion polymerization.

This invention is not to be limited to any particular formula for polymerization since numerous modifications may be made. The examples hereinafter described illustrate, but do not limit, this invention.

Polymerizations were carried out by a method similar to that described by Charles F. Fryling, Ind. Eng. Chem., Anal. Ed., 16, 1 (1944).

The recipe listed below was used for the preparation of the copolymers.

| | |
|---|---|
| Butadiene-1,3 grams | 7.5 |
| Styrene do | 2.5 |
| Mercaptan modifier do | 0.05 |
| Water do | 18.0 |
| Sodium salt of alkyl ester of the addition product of levopimaric acid and maleic anhydride grams | 0.54 |
| Potassium persulfate do | 0.03 |
| Temperature ° C | 50 |
| Time hours | 16–22 |

The polymers obtained were coagulated from the emulsifying solution and excess monomers removed by steam distillation. The polymers were then washed and dried and finally compounded on 4-inch diameter by 9-inch width mixing rolls, the width of these rolls being reduced to 1 inch by special guides. A conventional tread stock formula, listed below, was used to evaluate these elastomers.

| | Parts |
|---|---|
| Rubber | 100.00 |
| Sulfur | 2.25 |
| Accelerator | 1.50 |
| Zinc oxide | 5.00 |
| Carbon black | 50.00 |
| Stearic acid | 5.00 |

The milling and tack characteristics of the polymers prepared using the sodium salt of the alkyl esters of the addition product of levopimaric acid and maleic anhydride as the emulsifying agent were greatly improved over those prepared using a fatty acid soap as the emulsifying agent. A series of cures were made on each sample at 280° F. The data listed in the following table on typical cures show that the maximum tensile strength and elongation at break is much greater when the samples are prepared using the sodium salt of the alkyl esters of the addition product of levopimaric acid and maleic anhydride as the emulsifying agent than when fatty acid soaps are used as the emulsifying agent.

Table

| Example | Emulsifying Agent | Polymerization Time | Yield of Polymer | Max. Tensile Strength of Vulcanized Polymer | Elongation of Maximum Tensile Strength |
|---|---|---|---|---|---|
| | | Hours | Grams | P. s. i. | Percent |
| 1 | Sodium salt of the methyl ester of the addition product of levopimaric acid and maleic anhydride. | 22 | 6.68 | 4180 | 800 |
| 2 | Sodium salt of the ethyl ester of the addition product of levopimaric acid and maleic anhydride. | 17 | 8.83 | 3930 | 700 |
| 3 | Sodium salt of the ethyl ester of the addition product of levopimaric acid and maleic anhydride. | 18 | 8.58 | 4220 | 700 |
| 4 | Fatty acid soap. | 14 | 8.55 | 2760 | 475 |

Having thus described my invention, I claim:

1. In the process of polymerizing a butadiene-1,3 hydrocarbon with a polymerizable organic compound having ethylenic unsaturation in an aqueous emulsion, the improvement comprising carrying out the emulsion polymerization in the presence of an alkali salt of an alkyl ester of the addition product of levopimaric acid and maleic anhydride.

2. In the process of polymerizing a butadiene- 1,3 hydrocarbon with styrene in an aqueous emulsion, the improvement comprising carrying out the emulsion polymerization in the presence of an alkali salt of an alkyl ester of the addition product of levopimaric acid and maleic anhydride.

3. In the process of polymerizing butadiene with styrene in an aqueous emulsion, the improvement comprising carrying out the emulsion polymerization in the presence of an alkali salt of an alkyl ester of the addition product of levopimaric acid and maleic anhydride.

4. In the process of polymerizing a butadiene-1,3 hydrocarbon with a monomeric polymerizable aryl olefin in an aqueous emulsion, the improvement comprising carrying out the emulsion polymerization in the presence of the sodium salt of a lower mono-alkyl alkyl ester of the addition product of levopimaric acid and maleic anhydride.

5. In the process of polymerizing a butadiene-1,3 hydrocarbon with a monomeric polymerizable aryl olefin in an aqueous emulsion, the improvement comprising carrying out the emulsion polymerization in the presence of an alkali salt of mono-ethyl ester of the addition product of levopimaric acid and maleic anhydride.

6. In the process of polymerizing a butadiene-1,3 hydrocarbon with a monomeric polymerizable aryl olefin in an aqueous emulsion, the improvement comprising carrying out the emulsion polymerization in the persence of an alkali salt of the mono-methyl ester of the addition product of levopimaric acid and maleic anhydride.

7. The process of claim 1 in which 85 to 60 parts, by weight, of butadiene is copolymerized with 15 to 40 parts, by weight, of styrene, and the said alkali salt is the mono-alkyl ester and ranges from 0.5 to 5% based upon the water present.

RAY V. LAWRENCE.

No references cited.